United States Patent
Huang

[11] Patent Number: 6,024,053
[45] Date of Patent: Feb. 15, 2000

[54] EXERCISE DEVICE FOR CAT

[76] Inventor: Chin-Lien Huang, 2F, No. 14, Ning Hsia E. 5 St., Taichung, Taiwan

[21] Appl. No.: 09/221,976

[22] Filed: Dec. 29, 1998

[51] Int. Cl.⁷ .................................................. A01K 29/00
[52] U.S. Cl. ........................... 119/707; 119/706; 446/332
[58] Field of Search ........................... 482/148; 446/332, 446/168, 169, 171; 434/247, 258; 119/701–707; 47/65, 39

[56] References Cited

U.S. PATENT DOCUMENTS

| | | | |
|---|---|---|---|
| 1,686,359 | 10/1928 | Zedler | 446/332 |
| 1,836,640 | 12/1931 | Bowman | 446/169 |
| 2,670,956 | 3/1954 | Ganz | 446/332 |
| 5,775,263 | 7/1998 | Richards | 119/706 |
| 5,806,464 | 9/1998 | Willinger et al. | 119/706 |
| 5,875,735 | 3/1999 | Bradley et al. | 119/706 |

FOREIGN PATENT DOCUMENTS 2333410  6/1977  France ..................................... 446/169

Primary Examiner—Richard J. Apley
Assistant Examiner—Justine R. Yu
Attorney, Agent, or Firm—Browdy and Neimark

[57] ABSTRACT

An exercise device is designed for use by a cat and composed of a base which a machine body is mounted. The machine body is provided with two plates, a receiving space located between the two plates, and a track located between the edges of the two plates such that the track is in communication with the receiving space. A drive mechanism is disposed in the machine body and composed of a cycling unit having a drive wheel and a driven wheel which is linked with the drive wheel by a transmission belt. The cycling unit is driven by a drive device mounted on one of the two plates. A lure is attached to the transmission belt. A plurality of loading members are fastened with the two plates of the machine body.

4 Claims, 3 Drawing Sheets

EXERCISE DEVICE FOR CAT

FIELD OF THE INVENTION

The present invention relates generally to an exercise device for a pet, and more particularly to an exercise device for a cat.

BACKGROUND OF THE INVENTION

The exercise device for animal is almost nonexistent, with the exception of a simple device made of a rotary coil on which a mouse runs continuously.

SUMMARY OF THE INVENTION

The primary objective of the present invention is to provide an exercise device for a cat.

In keeping with the principle of the present invention, the foregoing objective of the present invention is attained by the exercise device which is intended for use by a cat and is composed of a base on which a machine body is mounted. The machine body is provided with two plates, a receiving space located between the two plates, and a track located between the edges of the two plates such that the track is in communication with the receiving space. A drive mechanism is disposed in the machine body and composed of a cycling unit having a drive wheel, and a driven wheel which is linked with the drive wheel by a transmission belt. The cycling unit is driven by a drive device mounted on one of the plates. A lure is attached to the transmission belt. A plurality of loading members are fastened with the two plates of the machine body.

The foregoing objective, features and functions of the present invention will be more readily understood upon a thoughtful deliberation of the following detailed description of a preferred embodiment of the present invention with reference to the accompanying drawings.

DETAILED DESCRIPTION OF THE INVENTION

Figure 1:
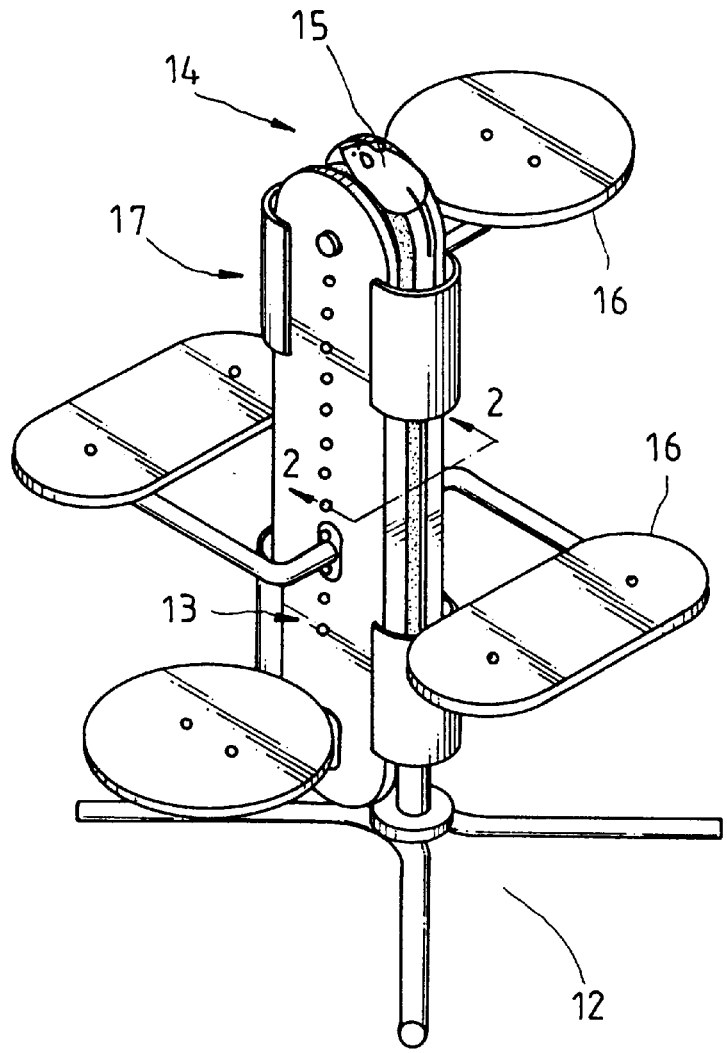
FIG. 1 shows a perspective view of the preferred embodiment of the present invention.
Figure 2:
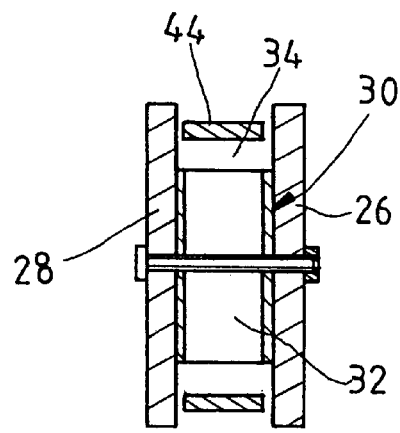
FIG. 2 shows a sectional view of a portion taken along the direction indicated by a line 2—2 as shown in FIG. 1.
Figure 3:
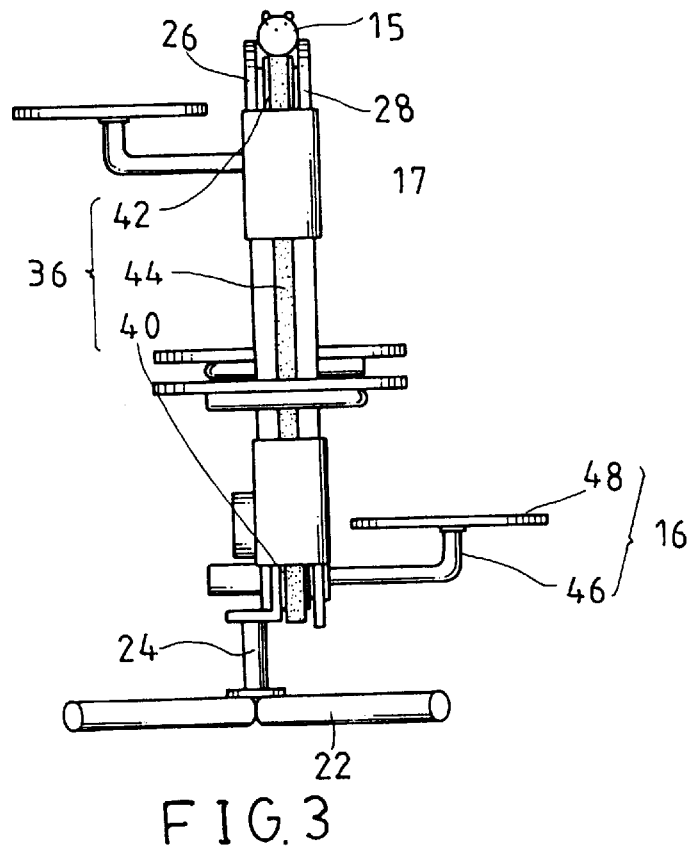
FIG. 3 shows a left elevational view of the preferred embodiment of the present invention.
Figure 4:
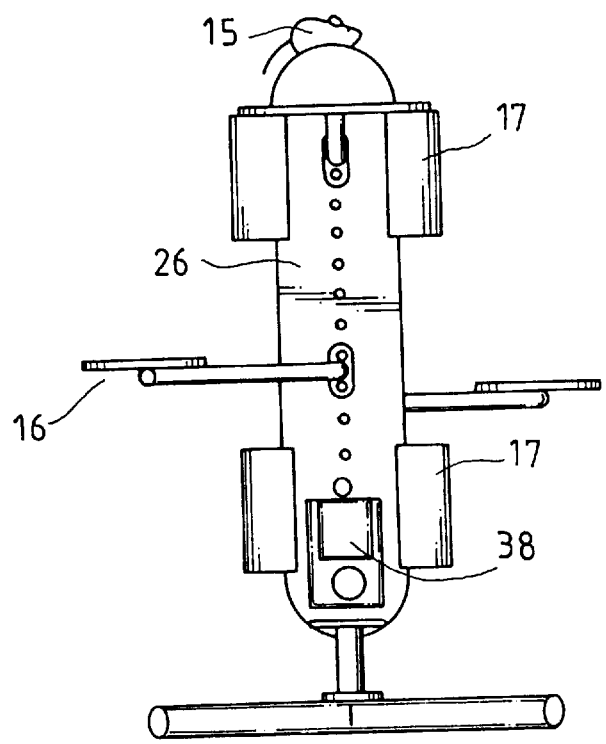
FIG. 4 shows a rear elevational view of the preferred embodiment of the present invention.

As shown in FIGS. 1–4, a cat exercise device 10 embodied in the present invention is composed of a base 12, a machine body 13, a drive mechanism 14, a lure 15, four loading members 16, and four covers 17.

The base 12 has a cruciform leg portion 22, and a bracing portion 24 located in the axis of the leg portion 22.

The machine body 13 has two oval plates 26 and 28, which are opposite in location to each other, and a receiving space 30 located between and defined by the two plates 26 and 28. A partition 32 is securely located in the receiving space 30 such that the partition 32 is separated from the two plates 26 and 28 by a distance, so as to form a track 34 circumventing the machine body 13. The plate 26 of the machine body 13 is mounted on the bracing portion 24.

The drive mechanism 14 consists of a cycling unit 36 and a drive device 38. The cycling unit 36 has a drive wheel 40 and a driven wheel 42, which are pivoted respectively between the partition 32 and the plates 26 and 28. The drive wheel 40 and the driven wheel 42 are linked with a transmission belt 44 which is located in the track 34. The rotational speed of the drive wheel 40 is regulated by the drive device 38.

The lure 15 is an artificial mouse and is attached to the transmission belt 44 such that the lure 15 can be moved along with the transmission belt 44 in the track 34.

The loading members 16 are formed of a support body 46 and a loading board 48 which is mounted on the free end of the support body 46. The support bodies 46 are fastened at one end thereof with the two plates 26 and 28 such that the support bodies 46 circumvent the machine body 13. The loading boards 48 are separated from the machine body 13. The loading boards 48 are separated from the machine body 13 by a distance such that the loading boards 48 are located at various levels.

The covers 17 have a semicircular cross section and are fastened with two sides of the top and the bottom of the machine body 13 such that the covers 17 are separated from the track 34 by an appropriate distance.

Figure 5:
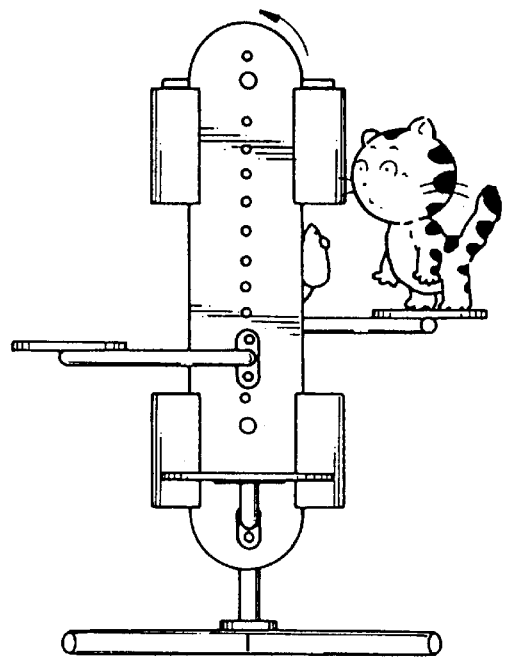
FIGS. 5 and 6 are schematic views of the preferred embodiment of the present invention at work.
Figure 6:
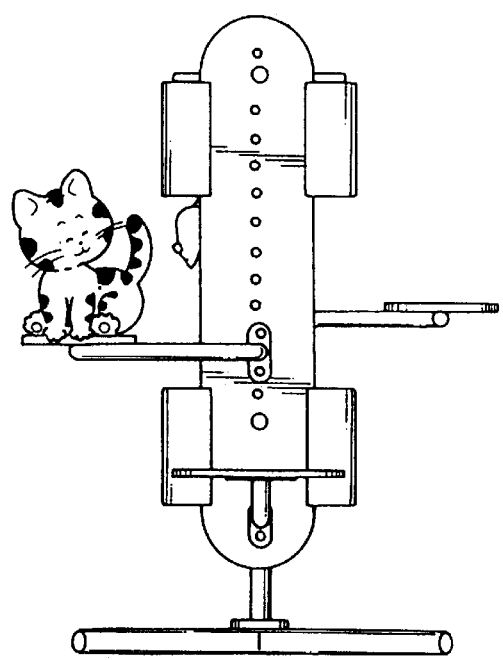

In operation, a cat is put on any one of the loading boards 48 before the drive device 38 is started, as shown in FIGS. 5 and 6. As the drive device 38 is started, the drive wheel 40 is driven by the drive device 38 to turn. As a result, the transmission belt 44 is actuated to move the lure 15 in the track 34 such that the lure 15 circumvents the machine body 13. As the lure 15 is so moved as to be close to any one of the loading boards 48, the cat is lured to jump to that loading board 48. In light of the lure 15 being circulated around the machine body 13, the cat is lured to jump from one loading board 48 to another loading board 48. The covers 17 are intended to conceal the lure 15 in motion for a short period of time, so as to promote the desire of the cat to hunt for prey.

What is claimed is:

1. An exercise device for a cat, said exercise device comprising:

a base;

a machine body mounted on said base and composed of two plates, a receiving space located between and defined by said two plates, a track circumventing said two plates such that said track is in communication with said receiving space;

a drive mechanism consisting of a cycling unit and a drive device, said cycling unit having a drive wheel and a driven wheel which is linked with said drive wheel by a transmission belt located in said receiving space, said drive device being mounted on one of said two plates for driving said cycling unit;

a lure attached to said transmission belt such that said lure is moved along with said transmission belt in said receiving space; and a plurality of loading members fastened with said two plates such that said loading members are separated from said track by a distance.

2. The exercise device as defined in claim 1 further comprising a plurality of covers, said covers being fastened with said two plates such that said covers are separated from said track by a predetermined distance.

3. The exercise device as defined in claim 1, wherein said machine body is further composed of a partition located between said two plates for forming said track; and wherein said drive wheel and said driven wheel are mounted pivotally between said partition and said two plates.

4. The exercise device as defined in claim 1, wherein said loading members are formed of a support body fastened at one end thereof with said machine body, and a loading board fastened with other end of said support body.

* * * * *